(12) United States Patent
Ökvist et al.

(10) Patent No.: US 10,477,559 B2
(45) Date of Patent: Nov. 12, 2019

(54) HANDOVER OF A USER EQUIPMENT BETWEEN AN INDOOR AND AN OUTDOOR NETWORK NODE

(71) Applicant: Telefonaktiebolaget LM Ericsson (publ), Stockholm (SE)

(72) Inventors: Peter Ökvist, Luleå (SE); Tomas Jönsson, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/759,854

(22) PCT Filed: Jul. 7, 2016

(86) PCT No.: PCT/SE2016/050695
§ 371 (c)(1),
(2) Date: Mar. 14, 2018

(87) PCT Pub. No.: WO2017/061920
PCT Pub. Date: Apr. 13, 2017

(65) Prior Publication Data
US 2018/0262961 A1  Sep. 13, 2018

Related U.S. Application Data

(60) Provisional application No. 62/237,602, filed on Oct. 6, 2015.

(51) Int. Cl.
*H04W 36/00* (2009.01)
*H04W 72/04* (2009.01)
(Continued)

(52) U.S. Cl.
CPC ........ *H04W 72/048* (2013.01); *H04B 17/318* (2015.01); *H04W 24/08* (2013.01);
(Continued)

(58) Field of Classification Search
CPC ............... H04W 72/048; H04W 24/08; H04W 36/0083; H04W 36/14; H04W 36/32; H04W 36/00837; H04B 17/318
See application file for complete search history.

(56) References Cited

U.S. PATENT DOCUMENTS 5,987,319 A  11/1999 Hermanisson et al.
2008/0146153 A1  6/2008 Grosspietsch et al.
(Continued)

FOREIGN PATENT DOCUMENTS

EP  2161851 A1  3/2010
EP  2613588 A1  7/2013
(Continued)

OTHER PUBLICATIONS

Schroder, Andre et al., "User-assisted Coverage and Interference Optimization for Broadband Femtocells", FIP/IEEE International Symposium on Integrated Network Management-Workshops, Jun. 1-5, 2009, 1-6.
(Continued)

*Primary Examiner* — Barry W Taylor
(74) *Attorney, Agent, or Firm* — Sage Patent Group

(57) ABSTRACT

A method performed by a first network node is provided. The first network node, a second network node and a User Equipment, UE, operate in a wireless communications system. The first network node is located indoors, and the second network node is located outdoors. The method comprises any one out of:
when it is indicated that the UE is located indoors and is served by the second network node, adjusting (202) transmission parameters in the first network node to trigger a handover of the UE to the first network node located indoors, and
when it is indicated that the UE is located outdoors and is served by the first network node, adjusting (203) trans-
(Continued)

mission parameters in the first network node to trigger a handover of the UE to the second network node located outdoors.

14 Claims, 10 Drawing Sheets

(51) Int. Cl.
  *H04W 36/32* (2009.01)
  *H04W 64/00* (2009.01)
  *H04W 36/14* (2009.01)
  *H04B 17/318* (2015.01)
  *H04W 24/08* (2009.01)
  *H04W 16/28* (2009.01)
  *H04W 36/16* (2009.01)
  *H04W 88/02* (2009.01)
  *H04B 7/0413* (2017.01)

(52) U.S. Cl.
  CPC ....... *H04W 36/0083* (2013.01); *H04W 36/14* (2013.01); *H04W 36/32* (2013.01); *H04W 64/003* (2013.01); *H04W 64/006* (2013.01); *H04B 7/0413* (2013.01); *H04W 16/28* (2013.01); *H04W 36/165* (2013.01); *H04W 88/02* (2013.01)

(56) References Cited

U.S. PATENT DOCUMENTS

| | | |
|---|---|---|
| 2013/0143578 A1 | 6/2013 | Lekutai |
| 2013/0237245 A1* | 9/2013 | Tinnakornsrisuphap ................... H04W 64/00 455/456.1 |
| 2014/0171083 A1* | 6/2014 | Zhang .................. H04W 36/32 455/436 |
| 2014/0328327 A1 | 11/2014 | Xiao et al. |
| 2015/0038151 A1* | 2/2015 | Dalsgaard ......... H04W 36/0083 455/444 |
| 2015/0189568 A1 | 7/2015 | Stanze et al. |
| 2016/0249233 A1* | 8/2016 | Murray ............... B61L 27/0005 |
| 2017/0171777 A1* | 6/2017 | Laselva ................. H04W 24/10 |

FOREIGN PATENT DOCUMENTS

| | | |
|---|---|---|
| WO | 2015041579 A1 | 3/2015 |
| WO | 2015122821 A1 | 8/2015 |

OTHER PUBLICATIONS

Sinclair, Neil et al., "An Advanced SOM Algorithm Applied to Handover Management Within LTE", IEEE Transactions on Vehicular Technology, vol. 62, No. 5, Jun. 2013, 1-12.

Unknown, Author, "Indoor/Outdoor Classification for Indoor Positioning Enhancement", 3GPP TSG RAN WG1 Meeting #84bis, R1-162878, Busan, Korea, Apr. 11-16, 2016, 1-2.

Unknown, Author, "Text Proposal and Discussion on Indoor Outdoor Information", 3GPP TSG RAN WG1 Meeting #82, R1-153747, Beijing, China, Aug. 24-28, 2015, 1-3.

3GPP, "3rd Generation Partnership Project; Technical Specification Group Radio Access Network; Evolved Universal Terrestrial Radio Access (E-UTRA); Physical channels and modulation (Release 13)", 3GPP TS 36.211 V13.1.0, Mar. 2016, 1-155.

3GPP, "3rd Generation Partnership Project; Technical Specification Group Radio Access Network; Evolved Universal Terrestrial Radio Access (E-UTRA); Physical layer procedures (Release 13)", 3GPP TS 36.213 V13.1.1 (Mar. 2016), Mar. 2016, 1-361.

Cho, Kyong-Tak , et al., "Femtocell Power Control by Discrimination of Indoor and Outdoor Users", Wireless Telecommunications Symposium (WTS), Apr. 13-15, 2011, 1-6.

\* cited by examiner

HANDOVER OF A USER EQUIPMENT BETWEEN AN INDOOR AND AN OUTDOOR NETWORK NODE

TECHNICAL FIELD

Embodiments herein relate to a network node, a User Equipment (UE), and methods therein. In particular, they relate to adjusting parameters, related to whether the UE is indoors or outdoors.

BACKGROUND

User Equipments (UE) for communication are also known as e.g., wireless devices, terminals, mobile terminals, wireless terminals and/or mobile stations. UEs are enabled to communicate wirelessly in a cellular communications network or wireless communication system, sometimes also referred to as a cellular radio system or cellular networks. The communication may be performed e.g. between two UEs, between a UE and a regular telephone and/or between a UE and a server, such as server providing video streaming service, via a Radio Access Network (RAN) and possibly one or more core networks, comprised within the cellular communications network.

UEs may further be referred to as mobile telephones, cellular telephones, computers, or tablets with wireless capability, just to mention some further examples. The UEs in the present context may be, for example, portable, pocket-storable, hand-held, computer-comprised, or vehicle-mounted mobile devices, enabled to communicate voice and/or data, via the RAN, with another entity, such as another UE or a server.

A cellular communications network covers a geographical area which is divided into cell areas, mostly overlapping each other, wherein each cell area is served by a base station, e.g. a Radio Base Station (RBS), which sometimes may be referred to as e.g. eNodeB (eNB), NodeB, B node, Base Transceiver Station (BTS), or AP (Access Point), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the UEs within range of the base stations. The base stations and the UEs involved in communication may also be referred to as transmitter-receiver pairs, where the respective transmitter and receiver in a pair may refer to a base station or a UE, depending on the direction of the communication. Two UEs involved in D2D communication may also be referred to as a transmitter-receiver pair. In the context of this disclosure, the expression Downlink (DL) is used for the transmission path from the base station to a UE. The expression Uplink (UL) is used for the transmission path in the opposite direction i.e. from the UE to the base station.

Universal Mobile Telecommunications System (UMTS) is a third generation mobile communication system, which evolved from the GSM, and is intended to provide improved mobile communication services based on Wideband Code Division Multiple Access (WCDMA) technology. UMTS Terrestrial Radio Access Network (UTRAN) is essentially a radio access network using wideband code division multiple access for communication with terminals. The 3GPP has undertaken to evolve further the UTRAN and GSM based radio access network technologies.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. The data transmissions in LTE are controlled by the radio base station.

Indoor utilization of wireless cellular technology is emerging, and with this development, indoor specific deployments increase to meet network capacity and expectations of end user experience.

It will therefore be of emerging interest to know if a cellular user such as e.g. a UE, in fact is located indoors or outdoors. A network may try to find out if the UE is located indoors is by using positioning services, and more specifically in context of emergency matters. In public safety and emergency scenarios, it would be beneficial to gain better knowledge on e.g. in which building and in which floor a specific UE is located, to be able to warn the user of the UE by notification or call if the user of the UE is unknowable in danger, or the other way around if the UE is making an emergency call it is important to identify if the UE is inside a building to be able to send help.

Other areas of application may for example be network optimization algorithms and tuning where it is of interest to know if a UE is inside or outside a specific building, so that a base station may consider the indoor/outdoor classification in the radio resource management to improve the user experience of the UE. For example, indoor UEs may be assumed to be subject to specific mobility behavior, or may be requested to start monitoring indoor cells on a dedicated frequency carrier.

Unfortunately, indoor GPS positioning is often very inaccurate or even impossible. Some indoor radio systems with very high density of cells, such as e.g. Radio-Frequency Identification (RFID) which is a wireless use of electromagnetic fields to transfer data or similar, for the purposes of automatically identifying and tracking tags attached to objects, may possibly deduct a more accurate user location, but such systems are still very rare. RFID is a short range radio tags solution.

Other possible solutions are Inertial Navigation Systems (INS), with or without GPS support. An INS is a navigation aid that uses a computer, motion sensors and rotation sensors to continuously calculate e.g. the position of a moving object without the need for external references. However, so far none of these solutions is practically feasible for cellular UEs of today.

SUMMARY

It is therefore an object of embodiments herein to improve the performance in a wireless communications system.

According to a first example aspect of embodiments herein, the object is achieved by a method performed by a first network node. The first network node, a second network node and a User Equipment, UE, operate in a wireless communications system. The first network node is located indoors, and the second network node is located outdoors.

When it is indicated that the UE is located indoors and is served by the second network node, the first network node adjusts transmission parameters in the first network node to trigger a handover of the UE to the first network node located indoors, and when it is indicated that the UE is located outdoors and is served by the first network node, the first network node adjusts transmission parameters in the first network node to trigger a handover of the UE to the second network node located outdoors.

According to a second example aspect of embodiments herein, the object is achieved by a method performed by a User Equipment, UE. The UE, a first network node and a second network node are operable in a wireless communications system. The first network node is located indoors, and the second network node is located outdoors The UE sends, a message to the first network node, which message indicates any one out of:

That the UE is located indoors and is served by the second network node, and that the UE is located outdoors and is served by the first network node.

The UE then receives a signal from the first network node. The signal comprises any one out of:

Adjusted transmission parameters to trigger a handover of the UE to the first network node located indoors, when it is indicated that the UE is located indoors and is served by the second network node, and adjusted transmission parameters to trigger a handover of the UE to the second network node located outdoors, when it is indicated that the UE is located outdoors and is served by the first network node.

According to a third example aspect of embodiments herein, the object is achieved by a first network node 111. The first network node 111, a second network node 112 and a User Equipment, UE, 120 are operable in a wireless communications system 100. The first network node 111 is located indoors, and the second network node 112 is located outdoors. The first network node 111 is configured to:

when it is indicated that the UE 120 is located indoors and is served by the second network node 112, adjust transmission parameters in the first network node 111 to trigger a handover of the UE 120 to the first network node 111 located indoors, and when it is indicated that the UE 120 is located outdoors and is served by the first network node 111, adjust transmission parameters in the first network node 111 to trigger a handover of the UE 120 to the second network node 112 located outdoors.

According to a fourth example aspect of embodiments herein, the object is achieved by a User Equipment, UE, 120. The UE 120, a first network node 111 and a second network node 112 are operable in a wireless communications system. The first network node 111 is adapted to be located indoors, the second network node 112 is adapted to be located outdoors. The UE 120 is configured to send a message to the first network node 111, which message is adapted to indicate any one out of:

That the UE 120 is located indoors and is served by the second network node 112, and that the UE 120 is located outdoors and is served by the first network node 111.

The UE 120 is further configured to receive a signal from the first network node 111, which signal is adapted to comprise any one out of:

Adjusted transmission parameters to trigger a handover of the UE 120 to the first network node 111 located indoors, when it is indicated that the UE 120 is located indoors and is served by the second network node 112, and adjusted transmission parameters to trigger a handover of the UE 120 to the second network node 112 located outdoors, when it is indicated that the UE 120 is located outdoors and is served by the first network node 111.

Since, when it is indicated that the UE is located indoors and is served by the second network node located outdoor, the first network node adjusts transmission parameters in the first network node to trigger a handover of the UE to the first network node located indoors, or since, when it is indicated that the UE is located outdoors and is served by the first network node located indoor, the first network node adjusts transmission parameters in the first network node to trigger a handover of the UE to the second network node located outdoors, the UE can when being served on the wrong side of the wall be handed over to a network node located in the same side of the wall.

This is an advantage since there may typically be differences in user properties between indoor and outdoor, like mobility behaviour for example. Furthermore, the indoor system may be designed for users belonging to a certain building via their enterprise, and there is a desire to keep these separate. Furthermore it is possible to optimize the usage of the radio network by utilizing the properties of the indoor and outdoor environments respectively, taking advantage for example of the typically diverse radio channel properties available indoors. This is easiest to optimize if indoor and outdoor users can be identified and associated with the appropriate indoor/outdoor node.

BRIEF DESCRIPTION OF THE DRAWINGS

Examples of embodiments herein are described in more detail with reference to attached drawings in which.

DETAILED DESCRIPTION

Figure 1:
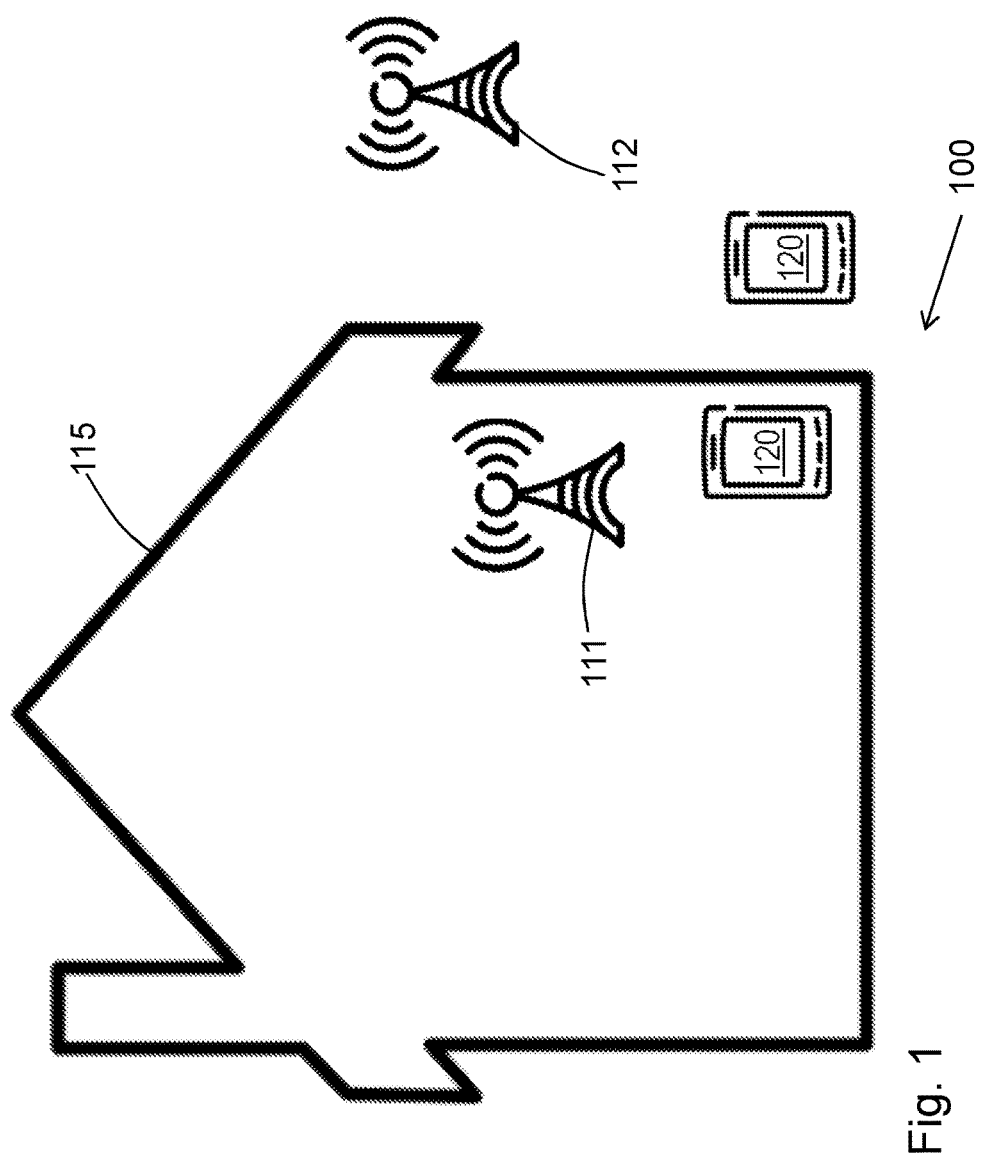
FIG. 1 is a schematic block diagram illustrating embodiments of a wireless communications network.

As part of developing embodiments, a problem will first be identified and discussed. Please note that the terms "UE" and "user" are used interchangeably in this document.

Node Power Tuning and Handover Cell Specific Offset (CSO) Adjustments

As mentioned above, it is increasingly interesting to know if a UE is located indoors or outdoors. Apart from Public safety emergency and blue-light aspects, for example radio network algorithms, network tuning, network dimensioning, and positioning may use such information to improve network operations and performance.

Typical parameters to adjust are node power and cell-specific handover thresholds, which may also be referred to as offsets, making a certain type of cells more or less appealing for a specific UE to enter.

3GPP fully supports cell specific handover offsets between any cell handover-pair constellation in which a UE may end up.

Fraction of Indoor UEs in a Network

Indoor user fractions may e.g. utilized as input to feature and algorithm evaluation simulations, and having a well-motivated and representative distribution between the amount of indoor and outdoor UEs, i.e. to dimension your indoor solution to cope with the correct amount of UEs, is essential to achieve proper evaluation results and to achieve reliable indications on technology potential and corresponding feature roadmaps.

Given today's ways of working, there are no reliable ways of achieving proper number on what share of users that typically are indoors and outdoors, apart from guesstimates and counting of individuals given a known and sufficiently graspable area & building complex.

It would be much easier and straightforward if the system had a built-in support to evaluate said indoor/outdoor ratio based on some reporting mechanism where the UE could provide the network with adequate information to enable such ratio calculations.

Modulation and Coding Scheme (MCS) Selection for Indoor UEs

As studies of indoor networks and systems become more evolved, it is clear that some of the radio network aspects are different for UEs that are located indoors and served by indoor systems. For example, there are results showing that the knowledge of a UE being indoors may be used to alter and/or enhance the choice of rank and MCS.

Indoor Localization Solutions

It is increasingly interesting to know if a UE/user is located indoors or outdoors. This is interesting from many aspects, for example radio network algorithms, network tuning, and positioning. It can also be interesting for mobile users to have their UEs change behavior depending on they are located.

As such, a functionality where the phone by itself evaluates "am I indoors or outdoors" has been discussed.

A framework to carry such of indoor/outdoor information entity to the network was recently suggested and discussed for 3GPP RAN1 (R1-153747).

A UE may be capable of classifying whether it is indoors or outdoors, for example via analysis of magnetic fields, ambient light spectral density, radio network fingerprinting, etc.

Apart from the UE-supported signalling framework mentioned above, methods to estimate indoor/outdoor fraction may be used.

Given that such signalling framework and reporting is available, several novel applications emerge.

In radio networks of today, there is a challenge of tuning transition zones between indoor and outdoor systems to full satisfaction automatically.

For example, extensive or ill-advised utilization of Indoor dominance as design paradigm may turn into unwanted, or in worst case severe, indoor-to-outdoor unwanted/undesired/unplanned/unintentional coverage also referred to as coverage bleeding. Thus bleeding here means undesired coverage. Over-shooting of indoor cells to outdoors areas may cause indoor systems such as e.g. In-building Solutions (IBS) to pick up traffic it should not cater for. The intention to protect indoor UEs' integrity by for example avoiding indoor UEs to handover to a macro cell by increasing the power of the indoor system, i.e. imposing indoor dominance, may result in that the handover area between said indoor system and macro system is moved away from the "building" and hence its inhabited UEs. As a consequence, the corresponding handover area may be pushed into unforeseen locations, and into locations which hold significant physical movement of UEs, and as a result that the IBS picks up mobility from outdoor non-building traffic that the indoor system never originally had the intention of serving.

Thus, IBS nodes should be held at power levels that enable them to properly serve their targeted traffic uptake areas, while still having as low power as possible not bleeding into non-desired areas. Alternatively, the CSO-relation between indoor and outdoor cells should be set in such a manner, such as e.g. increasing the indoor cell uptake area, so that an indoor UE served by an outdoor cell ends up being served by the indoor cell. Individual power setting is available and 3GPP supports CSO.

Indoor bleeding observed from a Radio Dot System (RDS) deployed building has the potential to be dealt with reasonable efforts spent, but with the challenge to identify which individual Dot (or group of Dots) that cause(s) the bleeding, but with e.g. a fully split RDS installation having one dot per cell, or future versions with individual dot identification, this becomes straightforward.

Fraction of Indoor Users in a Network

There are currently no reliable methods to calculate the fractions of indoor users a specific cell or system holds, and deployment discussions often tend to state " . . . 80% of the systems' users are indoors" without any further motivation.

Embodiments herein e.g. provide methodologies that that may be used to balance and optimize indoor system performance utilizing is-indoor signaling framework.

Some embodiments may for example be utilized to balance node power setting, optimize cell Specific HO thresholds, calculate indoor user fractions and improve MCS selection.

FIG. 1 depicts an example of a wireless communications network 100 in which embodiments herein may be implemented. The wireless communications network 100 may be a wireless communication network such as an LTE, WCDMA, GSM network, any 3GPP cellular network, Wimax, Fifth Generation (5G) 5G/NX or any cellular network or system.

A plurality of network nodes operates in the wireless communications network 100 whereof two, a first network node 111 and a second network node 112 are depicted in FIG. 1. The network nodes 111, 112 may for example be an eNodeB, a NodeB, a Home Node B, a Home eNode B, a WiFi Access Point (AP) or any other network node capable to serve a UE in a wireless communications network. The network node 110 may in some embodiments be a Radio Network Controller (RNC). Both the first network node 111 and the second network node 112 may be located either outdoors or indoors. According to an example scenario the first network node 111 is located indoors e.g. in a building 115, and the second network node 112 is located outdoors.

According to another example scenario it does not matter whether a network node is indoors or outdoors, i.e. it may relate to any of the first network node 111 and the second network node 112 and in that case the network node referred to as the network node 111, 112.

A UE 120 operates in the wireless communications network 100. The UE 120 may be served by the first network node 111 or the second network node 112.

The UE 120 may e.g. be a wireless device, a mobile wireless terminal or a wireless terminal, a mobile phone, a computer such as e.g. a laptop, a Personal Digital Assistants (PDAs) or a tablet computer, sometimes referred to as a surf plate, with wireless capability, or any other radio network units capable to communicate over a radio link in a wireless communications network. Please note the term UE used in this document also covers other wireless devices such as Machine to machine (M2M) devices.

The UE 120 may be capable of classifying whether it is indoors or outdoors, for example via analysis of magnetic fields, ambient light spectral density, radio network fingerprinting, etc.

The UE 120 may be located indoors or outdoors of the building 115. The building 115 may e.g. be a mall a galleria, an arcade a hospital, an airport, an office building of varying sizes and forms, a science park, a university campus, a train station, a sporting venue, an arena, a construction site, a mining facility, a street markets, etc. The building 115 may e.g. comprise one or more companies, stores, etc.

Figure 2:
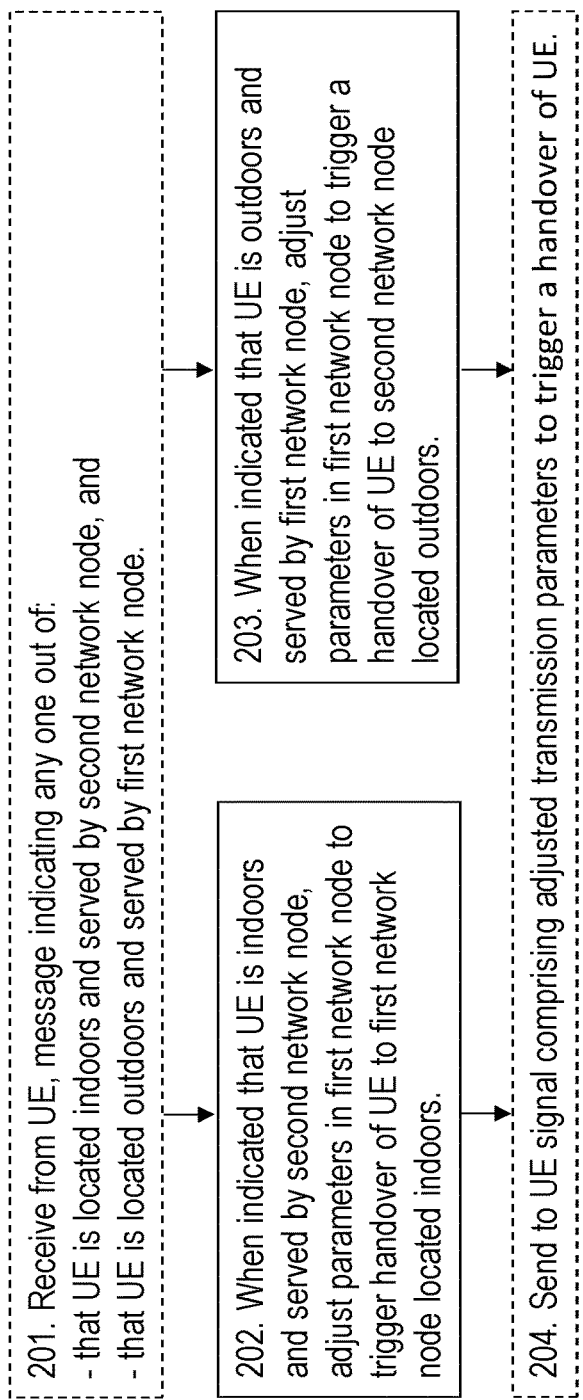
FIG. 2 is a flowchart depicting embodiments of a method in a first network node.

Example embodiments of a method performed by the first network node 111 will now be described with reference to a flowchart depicted in FIG. 2.

As mentioned above, the first network node 111, the second network node 112 and the UE 120 operates in the wireless communications system 100. The first network node 111 is located indoors, and the second network node 112 is located outdoors. The method comprising the following actions, which actions may be performed in any suitable order.

Action 201

In an example scenario, the UE 120 has established whether the UE 120 is or at least whether it is probable that the UE 120 is located indoors or outdoors and informs the first network node 111 accordingly. As mentioned above, the UE 120 may be capable of classifying whether it is indoors or outdoors, for example via analysis of magnetic fields, ambient light spectral density, radio network fingerprinting, etc. Thus, the first network node 111 may receive a message from the UE 120, which message indicates any one out of:

that the UE 120 is located indoors and is served by the second network node 112, and that the UE 120 is located outdoors and is served by the first network node 111.

Action 202

When it is indicated that the UE 120 is located indoors and is served by the second network node 112 which is located outdoors, also referred to as being served from the wrong side of a wall of the building 115 differing indoors from outdoors, the UE 120 may benefit from instead being served by the first network node 111 as it is also located indoors. Thus, when it is indicated that the UE 120 is located indoors and is served by the second network node 112, the first network node 111 adjusts transmission parameters in the first network node 111 to trigger a handover of the UE 120 to the first network node 111 located indoors. The indication may e.g. by sent in a Radio Resource Control (RRC) Connection setup, or in an RRC connection reconfiguration.

An example to adjust one of the transmission parameters is to adjust a transmission parameter for time to trigger such that: When it is indicated that the UE 120 is located indoors and is served by the second network node 112, the first network node 111 adjusts, also referred to as sets, the transmission parameter for time to trigger to decrease an enter-trigger period and increase an exit-trigger period to trigger the handover of the UE 120 to the first network node 111 located indoors.

Action 203

When it is indicated that the UE 120 is located outdoors and is served by the first network node 111 which is located indoors, the UE 120 may benefit from instead being served by the second network node 112 as it is also located outdoors.

Thus, when it is indicated that the UE 120 is located outdoors and is served by the first network node 111, the first network node 111 adjusting 203 transmission parameters in the first network node 111 to trigger a handover of the UE 120 to the second network node 112 located outdoors.

Another example to adjust one of the transmission parameters is to adjust a transmission parameter for time to trigger such that: When it is indicated that the UE 120 is located outdoors and is served by the first network node 111, the first network node 111 sets such as e.g. adjusts the parameter for time to trigger to decrease an enter-trigger period and increase an exit-trigger period to trigger a handover of the UE 120 to the second network node 112 located outdoors.

The transmission parameters to be adjusted may relate to any one or more out of: output power, antenna beam, handover thresholds, handover offsets, cell specific offset, time-to-trigger, and HO-related time/measure filtering constants. These examples of transmission parameters may be adjusted to trigger the above mentioned handovers and they will be described more in detail below.

Action 204

In order to inform the UE 120 about the adjusted transmission parameters, the first network node 111 sends a signal to the UE 120, which signal comprises any one out of:

Adjusted transmission parameters to trigger a handover of the UE 120 to the first network node 111 located indoors, when it is indicated that the UE 120 is located indoors and is served by the second network node 112, and adjusted transmission parameters to trigger a handover of the UE 120 to the second network node 112 located outdoors, when it is indicated that the UE 120 is located outdoors and is served by the first network node 111.

Note that in current LTE and in the case when it is indicated that the UE 120 is located indoors and is served by the second network node 112, the network node 111 cannot initiate and/or signal handover to itself. The UE 120 only communicates with the serving cell in LTE, and hence all communication is performed via the network nod in the serving cell in current LTE.

The information about the adjusted parameters is used by the UE 120 to assist in selecting the correct serving node for its location.

This is an advantage e.g. for optimizing for the actual indoor/outdoor environment as mentioned above.

An example embodiment of the method performed by the first network node 111 is described with reference to a flowchart depicted in FIG. 2.

The first network node 111, the second network node 112 and a User Equipment, UE, 120 are operable in a wireless communications system. In this example scenario, the first network node 111 is located indoors, and the second network node 112 is located outdoors. The method comprising any one out of:

When it is indicated that the UE 120 is located indoors and is served by the second network node 112, adjusting 202 parameters in the first network node 111 to trigger a handover of the UE 120 to the first network node 111 located indoors, and when it is indicated that the UE 120 is located outdoors and is served by the first network node 111, adjusting 203 parameters in the first network node 111 to trigger a handover of the UE 120 to the second network node 112 located outdoors.

In some embodiments, parameters relates to any one or more out of: output power, antenna beam, handover thresholds, cell specific offset, time-to-trigger, and HO-related time/measure filtering constants.

In some embodiments the method further comprises sending 204 a signal to the UE 120, which signal comprises any one out of:

Adjusted transmission parameters to trigger a handover of the UE 120 to the first network node 111 located indoors, when it is indicated that the UE 120 is located indoors and is served by the second network node 112, and adjusted transmission parameters to trigger a handover of the UE 120 to the second network node 112 located outdoors, when it is indicated that the UE 120 is located outdoors and is served by the first network node 111.

In some embodiments, the method further comprises:

Receiving 201, a message from the UE 120, which message indicates any one out of:

That the UE 120 is located indoors and is served by the second network node 112, and that the UE 120 is located outdoors and is served by the first network node 111.

Figure 3:
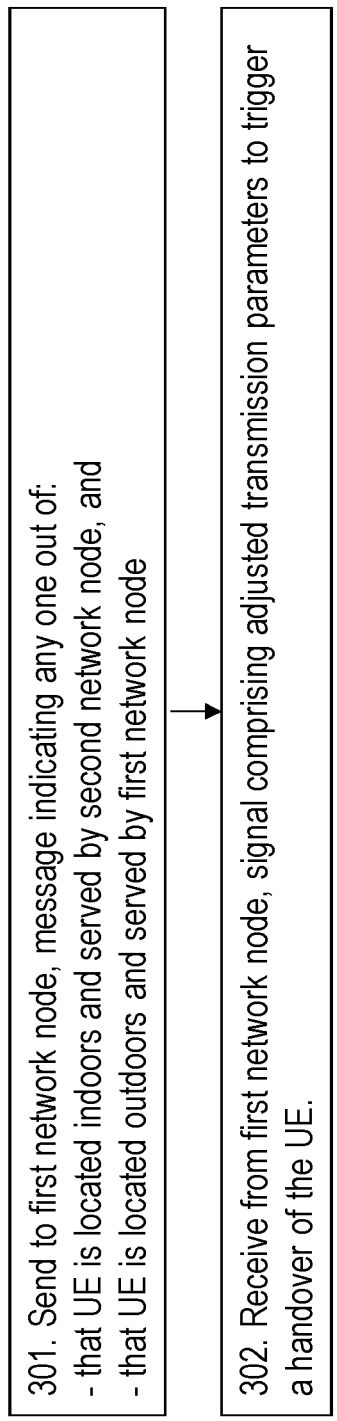
FIG. 3 is a flowchart depicting embodiments of a method in a UE.

Example embodiments of a method performed by the UE 120 are described with reference to a flowchart depicted in FIG. 3. As mentioned above, the UE 120, the first network node 111 and the second network node 112 are operable in a wireless communications system. The first network node 111 is located indoors, the second network node 112 is located outdoors. The method comprises the following actions, which actions may be performed in any suitable order.

Action 301

In the example scenario as mentioned above, the UE 120 has established whether the UE 120 is or at least whether it is probable that the UE 120 is located indoors or outdoors and informs the first network node 111 accordingly. As further mentioned above, the UE 120 may be capable of classifying whether it is indoors or outdoors, for example via analysis of magnetic fields, ambient light spectral density, radio network fingerprinting, etc. The UE 120 thus sends a message to the first network node 111, which message indicates any one out of:

That the UE 120 is located indoors and is served by the second network node 112, and that the UE 120 is located outdoors and is served by the first network node 111.

As mentioned above, the UE 120 may be requested to provide information about its capabilities to establish whether it is indoors or outdoors, e.g. via LPP, LPPe, RRC, etc.

For example, in LPP a message content may be modified to accommodate an indoor/outdoor classification capability IndoorClassificationInfo, see below Action 302

The UE 120 receives a signal from the first network node 111, which signal comprises any one out of:

adjusted transmission parameters to trigger a handover of the UE 120 to the first network node 111 located indoors, when it is indicated that the UE 120 is located indoors and is served by the second network node 112, and Adjusted transmission parameters to trigger a handover of the UE 120 to the second network node 112 located outdoors, when it is indicated that the UE 120 is located outdoors and is served by the first network node 111.

The signal may e.g. be sent in an RRC Connection setup, and an RRC connection reconfiguration.

The adjusted transmission parameters may relate to any one or more out of: output power, antenna beam, handover thresholds, cell specific offset, time-to-trigger, and HO-related time/measure filtering constants.

In some embodiments, the adjusted transmission parameters are adapted to comprise an adjusted transmission parameter for time to trigger comprising:

when it is indicated that the UE 120 is located indoors and is served by the second network node 112, the parameter for time to trigger is set to decreasing an enter-trigger period and increasing an exit-trigger period to trigger the handover of the UE 120 to the first network node 111 located indoors, and when it is indicated that the UE 120 is located outdoors and is served by the first network node 111 the parameter for time to trigger is set to decreasing an enter-trigger period and increasing an exit-trigger period to trigger a handover of the UE 120 to the second network node 112 located outdoors.

An example embodiment of the method performed by the UE 120 is described with reference to a flowchart depicted in FIG. 3.

The UE, 120, the first network node 111 and the second network node 112 are operable in a wireless communications system 100. In this example scenario, the first network node 111 is located indoors, and the second network node 112 is located outdoors. The method comprising any one out of:

Sending 301, a message to the first network node 111. The message indicates any one out of:

That the UE 120 is located indoors and is served by the second network node 112, and that the UE 120 is located outdoors and is served by the first network node 111.

Receiving 302 a signal from the first network node 111. The signal comprises any one out of:

adjusted transmission parameters to trigger a handover of the UE 120 to the first network node 111 located indoors, when it is indicated that the UE 120 is located indoors and is served by the second network node 112, and Adjusted transmission parameters to trigger a handover of the UE 120 to the second network node 112 located outdoors, when it is indicated that the UE 120 is located outdoors and is served by the first network node 111.

Embodiment's herein will now be further described and explained. The text below is applicable to and may be combined with any suitable embodiment described above.

Figure 4:
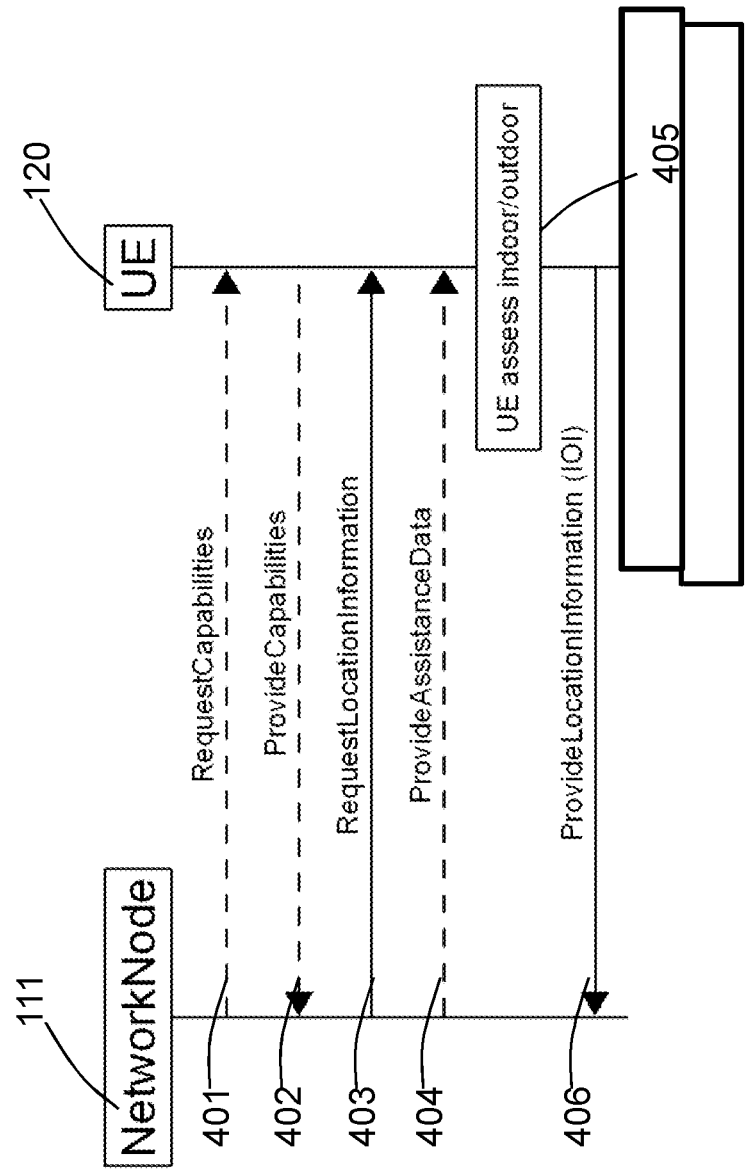
FIG. 4 is a sequence diagram depicting a method of signalling.

An example of such signaling scheme is illustrated in FIG. 4.

Indoor/outdoor classification for emergency call positioning may be used according to embodiments herein, in line with the existing reporting structures in 3GPP from a network node perspective:

The network node 111, 112 requests capabilities 401 from the UE 120, e.g. Request for UE capabilities regarding indoor classification.

The UE 120 sends 402 information about its capabilities from the network node 111, 112.

The network node 111, 112 then requests location information 403 from the UE 120, such as request location information including the indoor classification e.g. information of whether or not being indoor, possibly providing assistance data, see below.

The network node 111, 112 may provide assistance data 404 from the UE 120. Assistance data may e.g. be GPS information or other available position/location information.

The UE 120 assesses 405 whether being outdoor or indoor, related to establishing whether or not being indoor in Action 301.

The UE 120 then provides location information 406 to the network node 111, 112, such as information about the outcome of the assessment of whether being outdoor or indoor also referred to as whether or not being indoor and/or reception of location information including indoor classification.

FIG. 4 provides generic signalling to support indoor classification reporting, essentially using LTE Positioning Protocol (LPP) messages where the network node 111, 112 is a location server. Alternatively, the indoor classification information may be provided via LPP extensions (LPPe) or Radio Resource Control (RRC)+LPPe. For LPP/LPPe, the benefit is that the indoor classification signalling may be tailored and optimized to the E911 use cases, while for RRC the benefit is that the indoor classification signalling may be more generic and supporting also RRM use cases. E911 is a system e.g. used in North America that links emergency callers with the appropriate public resources.

For E911 purposes, the estimated position may be mapped to a dispatchable address. However, albeit reasonably good accuracy may be provided by baseline techniques such as OTDOA, the mapping to a civic address may be inaccurate. In particular, the UE 120 may be indoors at the estimated address, or outdoors in the vicinity to the estimated address. An advantage would therefore be to also have the capability to estimate whether the UE is indoors or outdoors. This will facilitate the planning of public safety operations in response to the E911 call.

Transmission parameters to be adjusted.

Adjusting Output Power

Embodiment 1 relates to the transmission parameter being output power of the first network node 111 and/or second network node 112 for reducing indoor-to-outdoor unintentional coverage, also referred to as node power tuning, Indoor vs. outdoor.

If a UE such as e.g. the UE 120 is located outside the building 115, i.e. outdoors, served by an indoor node, such as the first network node 111, and having an outdoor node, such as the second network node 112, as a close enough neighbor, the power of the indoor node such as the first network node 111 is adjusted, in this case decreased so that the UE 120 is instead served by the appropriate outdoor node, i.e. the second network node 112.

Figure 5:
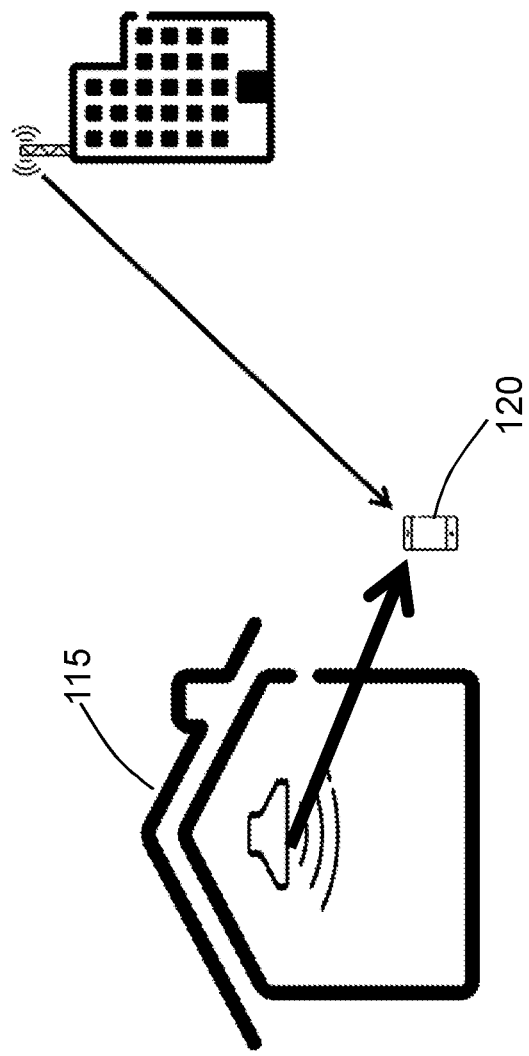
FIG. 5 is a schematic block diagram illustrating embodiments of an example scenario.
Figure 6:
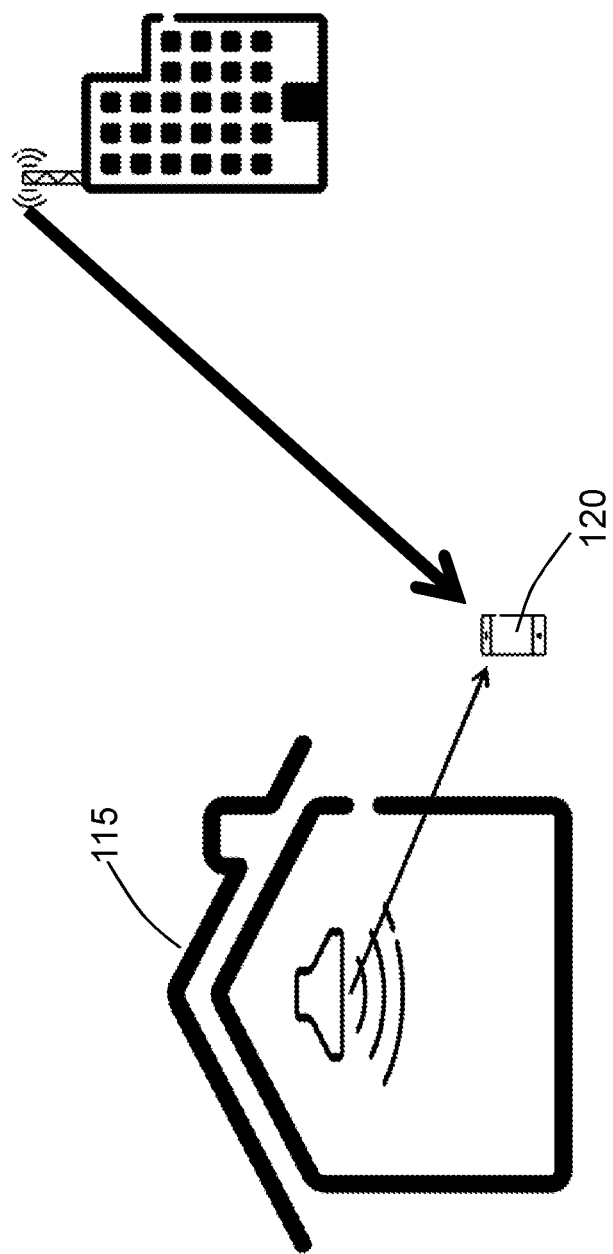
FIG. 6 is a schematic block diagram illustrating embodiments of an example scenario.

In FIG. 5, a UE such as the UE 120 is located outside the building 115, but still has the indoor node such as the first network node 111 as a serving node rather than the outdoor macro such as the second network node 112. In FIG. 6, according to embodiments herein, the first network node 111 notes that the UE 120 is served from "the wrong side of the wall" and reduces the power of the serving indoor node such as the first network node 111, in for example a radio DOT or radio DOT system, such that the UE 120 becomes served by the outdoor node i.e. the second network node 112 instead. The indoor system such as the first network node 111 is automatically tuned to stay inside the building, which may mean that the beam of the first network node 111 is decreased such that it only covers an area inside the building 115. A Radio DOT System is a distributed indoor system with one or more transmission points fed over CAT cable from an Indoor Radio Unit IRU.

Typically this may be done on longer time scales by monitoring network measurements for all UEs in a cell(s), for example hourly, per 3 hours, 2 times a day, daily, weekly, monthly to monitor the distribution of UEs, are they in "the right" cell or not. For example, it may be decided that a certain percentage of the UEs or percentage of measurement samples should be within a certain range of the desired cell.

Embodiment 2—relates to the transmission parameter being output power of the first network node 111 for securing proper indoor coverage by "indoor system" such as the first network node 111.

If a UE such as the UE 120 is located indoors in the presence of an indoor node, such as the first network node 111, however having an outdoor node such as the second network node 112, as the strongest/serving cell, the power of the indoor node is adjusted in this case increased so that the indoor node i.e. the first network node 111 becomes the strongest serving cell.

Figure 7:
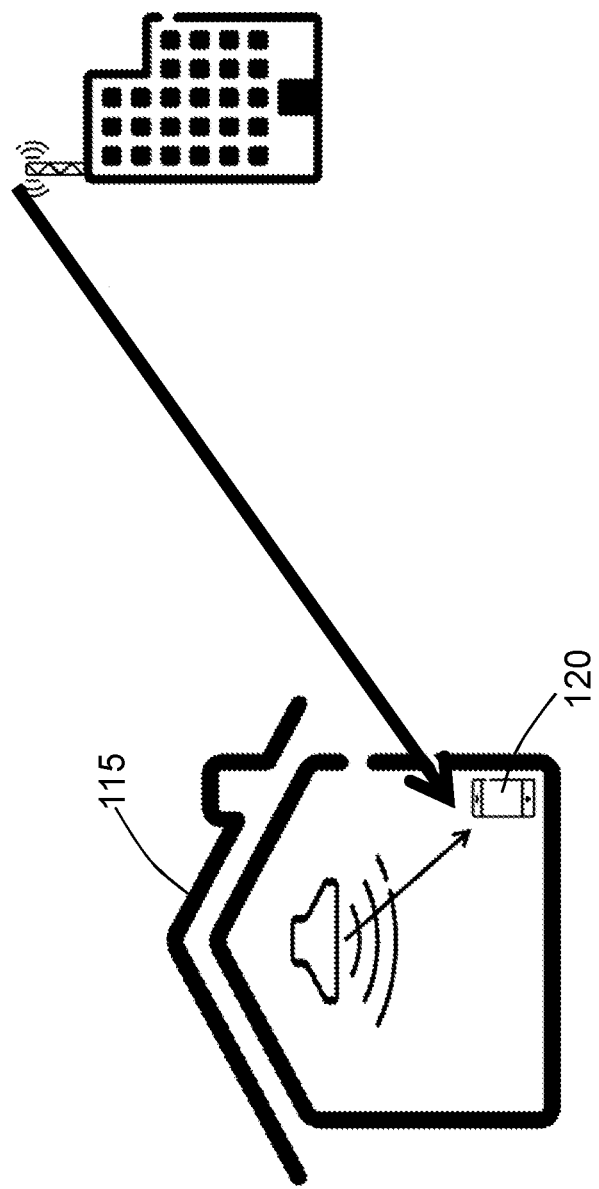
FIG. 7 is a schematic block diagram illustrating embodiments of an example scenario.
Figure 8:
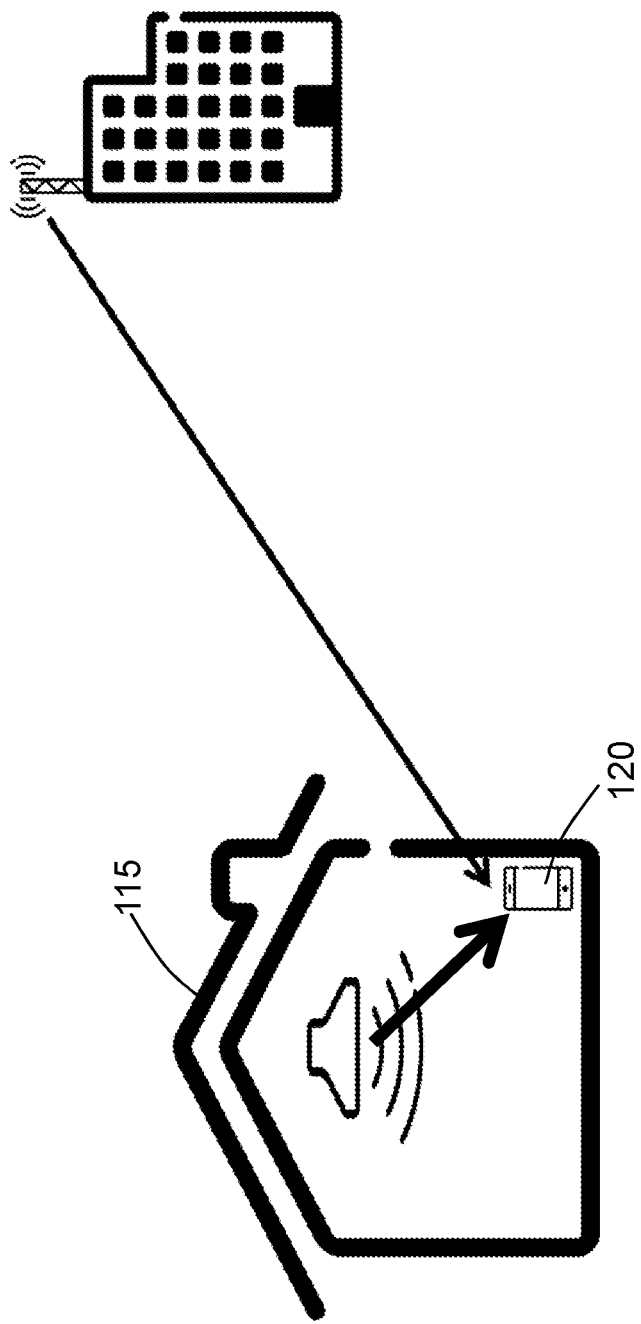
FIG. 8 is a schematic block diagram illustrating embodiments of an example scenario.

In FIG. 7, the UE 120 is located inside the building 115, i.e. indoors, but the indoor node such as the first network node 111 is not strong enough and is instead served by the outdoor macro node such as the second network node 112. In FIG. 8, according to embodiments herein, the first network node 111 notes that the UE 120 is served from "the wrong side of the wall" i.e. is served by the second network node 112, and increases the power of the individual indoor node such as the first network node 111 to make it the strongest/serving cell, automatically tuning the indoor system to cover the whole building.

Typically this may be done on longer time scales by monitoring network measurements for all UEs in a cell(s), for example hourly, per 3 hours, 2 times a day, daily, weekly, monthly to monitor the distribution of UEs, are they in "the right" cell or not. For example, it may be decided that a certain percentage of the UEs or percentage of measurement samples should be within a certain range of the desired cell.

Adjusting Antenna Beam

Embodiment 3—relates to the transmission parameter being the antenna beam of the first network node 111 to be adjusted.

If an indoor UE such as the UE 120 is in the presence of an indoor system e.g. served by a network node such as the first network node 111, but having an outdoor node, such as the second network node 112, as the strongest server, the antenna beam of the first network node 111, in the case that this is available, is adjusted instead of or in combination with the output power to make the indoor node, such as the first network node 111, the strongest server if possible. The adjustment of the antenna beam may be performed by for example switching between a set of available antenna beams or steering a steerable antenna beam. Typically, this may need to be performed with faster feedback and per individual UE such as the UE 120.

Adjusting Handover Parameters

Handover, Cell Specific Offset (CSO) adjustments may be performed according to 3GPP 36.331.

Event A3 is defined as a triggering event when a neighbour cell becomes an offset better than the serving cell. The UE creates a measurement report, populates the triggering details and sends the message to the serving cell. The parameters that define the trigger comprises:

Mn: is the measurement result of the neighbouring cell

Ms: is the measurement result of the neighbouring cell a3offset: This parameter can be found in 3GPP 36.331. It configures the RRC IE a3-Offset included in the IE reportConfigEUTRA in the MeasurementConfiguration IE. The value sent over the RRC interface is twice the value configured, that is, the UE has to divide the received value by 2. The role of the offset in Event A3 is to make the serving cell look better than its current measurement in comparison to the neighbour.

Hysteresisa3: The role of the hysteresis in Event A3 is to make the measured neighbour look worse than measured to ensure it is really stronger before the UE decides to send a measurement report to initiate a handover.

TimetoTriggerA3: Used in Event A3 to avoid a ping-pong effect.

CellIndividualoffsetEutran: This parameter is applied individually to each neighbour cell with load management purposes. The higher the value allocated to a neighbour cell, the "more attractive" it will be. This parameter can only be used if the neighbour list is broadcasted in SIB4 or in an RRC connection reconfiguration.

In today's LTE network operations, event A3 will trigger when a neighbour cell becomes an offset better than the serving cell, as:

$$Mn-\text{hysteresisA3}+\text{cellIndividualOffsetEUtran}>Ms+a3\text{offset}$$

This condition is valid for a timer TimeToTriggerA3. At the expiration of TimeToTriggerA3, if a UE such as the UE 120 does not receive an RRC connection reconfiguration message (i.e. handover command) from an eNB, then it will start a timer called ReportingIntervalA3. At the expiration of this timer, if the conditions for event A3 are still met and the eNB has not responded, then another measurement report will be sent to the eNB. Process will continue until eNB responds or until a number of measurement reports given by parameter ReportingAmount have been sent.

Correspondingly, a UE such as the UE 120 will exit Event A3, following:

$$Mn+\text{hysteresisA3}+\text{cellIndividualOffsetEUtran}<Ms+a3\text{offset}$$

The parameter cellIndividualOffsetEUtran is suggested an update reflecting whether said UE 120 is outdoors, but served by an indoor node, or indoors being served by an outdoor node.

In that context, cellIndividualOffsetEUtran will be increased with a factor CSO_delta_i depending on scenario, according to:

```
IF("serving cell==outdoor node")AND
    (isindoor==FALSE)
    cellIndividualOffsetEUtran=cellIndividualOffsetEUtran
```
// The UE such as the UE 120 is connected to an outdoor node such as the second network node 112, the UE 120 is outdoors→OK, no change.

Please note that isindoor used in this document means "is indoors", e.g. the UE 120 is located indoors.

```
IF("serving cell==indoor node")AND
    (isindoor==FALSE)

CellIndividualOffsetEUtran_outdoor=cellIndividualOffsetEUt
        ran_outdoor-CSO_delta_1
```
// The UE such as the UE 120 is connected to indoor node such as the first network node 111, the UE 120 is outdoors→Not OK (NOK), shrink indoor node such as the first network node 111. Shrinking the indoor node such as the first network node 111 may be performed by adapting the handover parameters to pick up less traffic or reduce the output power so that the node is detected in a smaller area.

```
IF("serving cell==indoor node")AND
    (isindoor==TRUE)

cellIndividualOffsetEUtran_indoor/
        outdoor=cellIndividualOffsetEUtran_indoor/
        outdoor(unchanged);
```
// The UE such as the UE 120 is connected to indoor node such as the first network node 111, the UE 120 is indoors→OK, no change.

```
IF("serving cell==outdoor node")AND
    (isindoor==TRUE)

cellIndividualOffsetEUtran_outdoor=cellIndividualOffsetEUtra
        n_outdoor+CSO_delta_2(decrease probability
        outdoor serving)
```
// The UE such as the UE 120 is connected to outdoor node such as the second network node 112, the UE 120 is indoors→NOK, increase indoor node such as the first network node 111. Increasing the indoor node such as the first network node 111 may be performed as above but the other way around.

In a scenario where the is_indoor also referred to as isindoor parameter is not binary, i.e. TRUE or FALSE, but corresponds to a probability metric, different thresholding's may be considered. In an area where the UE 120 reports e.g. is_indoor=60%, i.e. the probability that the UE 120 is indoors is 60%, the CSO algorithm may apply a more/less aggressive CSO_delta adjustment depending on selected methodology. In another solution, the CSO_delta adjustment may be e.g. a linear, exponential, asymptotic variable of the is_indoor probability metric.

In a further embodiment, the parameter TimeToTriggerA3 may also be set with respect to a "UE is on wrong type of cell" perspective, for example decreasing the enter-trigger period for an indoor UE 120 being served by outdoor cell but increasing the exit-trigger period, making the system more responsive to move indoors users served by network node on the wrong side of the wall.

To achieve a stable filtering effect, the adjustment of CSO may typically be done on longer time scales by monitoring network measurements for all UEs in a cell(s), for example hourly, per 3 hours, 2 times a day, daily, weekly, monthly to monitor the distribution of UEs, are they in "the right" cell or not. For example, it may be decided that a certain percentage of the UEs or percentage of measurement samples should be within a certain range of the desired cell.

As mentioned above, means of reporting/signaling of the measurement of the detection, for example an indoor/outdoor bit, informing the network that the UE has classified itself as being indoor or outdoor may be used herein. In a further embodiment, the reporting may be extended to e.g. a 8 bit value resolving a UE-decided probability of being indoor or outdoor, or a more elaborated signaling/reporting where the UE sends up a larger amount of information, making a decision basis for the network to estimate if the UE is indoors or outdoors. A basic signaling scheme is illustrated in FIG. 4.

Fraction of Indoor UEs in a Network

According to some embodiments herein, the fraction of-indoor UEs may be calculated. A network node, such as the first network node 111 and the second network node 112, another network node, or another type of node higher up in the network architecture may grab the is_indoor-information aggregated from the UE 120 and other UEs below the node in the network. This is to be able to state the ratio, fraction, amount of indoor users for a cell, a building, an area, or a node type etc. The benefit is to have an actual number based on real measurements for this rather central number and/or metric. This has not been possible yet, due to the fact that there is no knowing if the users/UEs are indoor. For each cell A in considered radio network such as e.g. a cell served by the first network node 111, using signaling messages for Indoor Indication Signaling comprising any one or more out of:
- LTE Positioning Protocol (LPP) via Location Information messages
- Radio Resource Control (RRC) via Location Info information element, or MDT IEs, or measurement reports
- LPP Extensions (LPPe) modified;

And, for each UE B such as the UE 120, having cell A, such as a cell served by the first network node 111, as serving cell, retrieve is_indoor tag from signaling message.

For all UEs in cell A, calculate the fraction:

per_cell_indoor_user_fraction(PCIUF)=NumberOf
    (is_indoor==TRUE)/sum(NumberOf
    (is_indoor==TRUE)+NumberOf
    (is_indoor==FALSE))

Or, per_cell_indoor_user_fraction(PCIUF)=NumberOf
    (is_indoor==FALSE)/sum(NumberOf
    (is_indoor==TRUE)+NumberOf
    (is_indoor==FALSE))

Or, any expression representing same subset, e.g.:

per_cell_indoor_user_fraction(PCIUF)=NumberOf
    (is_indoor==TRUE)/TotalNumberOfUSersInCell This means that by using the isindoor_tag information a figure on the fraction, ratio or amount of indoor users may be stated. A number often discussed in radio networks such as that 80% of the users are indoors, however, this has so far been based on assumptions and other loose estimations. According to embodiments herein, it is possible calculate a much more precise estimation and/or measurement of this.

Per Cell Indoor User Fraction (PCIUF) may furthermore be summarized over cells in a network such as the wireless communications network 100, or over a subset of the network, achieving 'Per Network Indoor User Fraction' (PNIUF) or 'Per Network Subset Indoor User Fraction' (PNSIUF) or similar.

An advantage with embodiments herein is that when having a signaling framework supporting is-indoor information, such as an indication whether the UE is located indoors or outdoors, being sent from a UE to the network such as any of the first network node 111, i.e. having the network knowing if a UE is physically indoors or outdoors, it is feasible to carry out Self-Optimizing Network (SON)-like optimization with respect to a UE's location.

Without such signaling support, similar optimizations are up to guestimate algorithms that will become less efficient or not even possible.

Figure 9:
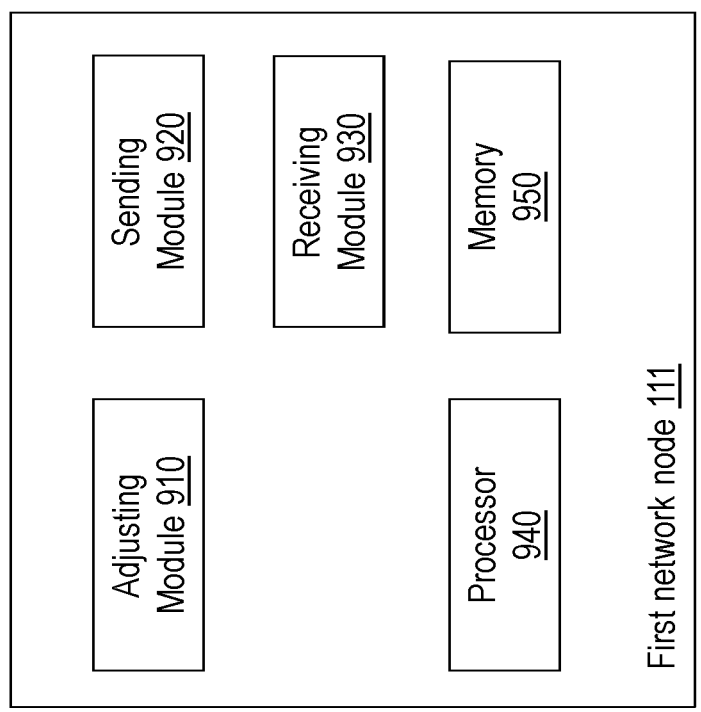
FIG. 9 is a schematic block diagram illustrating embodiments of a first network node.

To perform the method actions described above in relation to FIGS. 1 and 2, the first network node 111 may comprise the arrangement depicted in FIG. 9.

As mentioned above, the first network node 111, the second network node 112 and the UE 120 are operable in a wireless communications system 100. The first network node 111 is located indoors, and the second network node 112 is located outdoors.

The first network node 111 is configured to, e.g. by means of an adjusting module 910 configured to:
when it is indicated that the UE 120 is located indoors and is served by the second network node 112, adjust transmission parameters in the first network node 111 to trigger a handover of the UE 120 to the first network node 111 located indoors, and
when it is indicated that the UE 120 is located outdoors and is served by the first network node 111, adjust transmission parameters in the first network node 111 to trigger a handover of the UE 120 to the second network node 112 located outdoors.

In some embodiments, the first network node 111 is configured to, e.g. by means of the adjusting module 910 configured to, adjust the transmission parameters by adjusting a transmission parameter for time to trigger such that:
when it is indicated that the UE 120 is located indoors and is served by the second network node 112, adjusting the transmission parameter for time to trigger to decreasing an enter-trigger period and increasing an exit-trigger period to trigger the handover of the UE 120 to the first network node 111 located indoors, and
when it is indicated that the UE 120 is located outdoors and is served by the first network node 111 adjusting the transmission parameter for time to trigger to decreasing an enter-trigger period and increasing an exit-trigger period to trigger a handover of the UE 120 to the second network node 112 located outdoors.

The transmission parameters may be adapted to relate to any one or more out of: output power, antenna beam, handover thresholds, cell specific offset, time-to-trigger, and HO-related time/measure filtering constants.

The first network node 111 may further be configured to, e.g. by means of a sending module 920 configured to, send a signal to the UE 120, which signal is adapted to comprise any one out of:
adjusted transmission parameters to trigger a handover of the UE 120 to the first network node 111 located indoors, when it is indicated that the UE 120 is located indoors and is served by the second network node 112, and
adjusted transmission parameters to trigger a handover of the UE 120 to the second network node 112 located outdoors, when it is indicated that the UE 120 is located outdoors and is served by the first network node 111.

The first network node 111 may further be configured to, e.g. by means of a receiving module 1130 configured to, receive a message from the UE 120, which message is adapted to indicate any one out of:
that the UE 120 is located indoors and is served by the second network node 112, and
that the UE 120 is located outdoors and is served by the first network node 111.

To perform the method actions according to some embodiments described above in relation to FIGS. 1 and 2, the first network node 111 may comprise the arrangement depicted in FIG. 9.

The first network node 111 a second network node 112 and a User Equipment, UE, 120 are operable in a wireless communications system. In this example scenario, the first network node 111 is adapted to be located indoors, and the second network node 112 is adapted to be located outdoors. The network node is configured to, e.g. by means of an adjusting module 910 configured to:
when it is indicated that the UE 120 is located indoors and is served by the second network node 112, adjust parameters in the first network node 111 to trigger a handover of the UE 120 to the first network node 111 located indoors, and
when it is indicated that the UE 120 is located outdoors and is served by the first network node 111, adjust parameters in the first network node 111 to trigger a handover of the UE 120 to the second network node 112 located outdoors.

In some embodiments, the parameters relates to any one or more out of: output power, antenna beam, handover thresholds, cell specific offset, time-to-trigger, and HO-related time/measure filtering constants.

The first network node 111 may further be configured to, e.g. by means of a sending module 920 configured to, send a signal to the UE 120, which signal comprises any one out of:

adjusted transmission parameters to trigger a handover of the UE 120 to the first network node 111 located indoors, when it is indicated that the UE 120 is located indoors and is served by the second network node 112, and adjusted transmission parameters to trigger a handover of the UE 120 to the second network node 112 located outdoors, when it is indicated that the UE 120 is located outdoors and is served by the first network node 111.

In some embodiments, the first network node 111 is further configured to, e.g. by means of a receiving module 930 configured to, receive a message from the UE 120.

The message indicates any one out of:

that the UE 120 is located indoors and is served by the second network node 112, and that the UE 120 is located outdoors and is served by the first network node 111.

Figure 10:
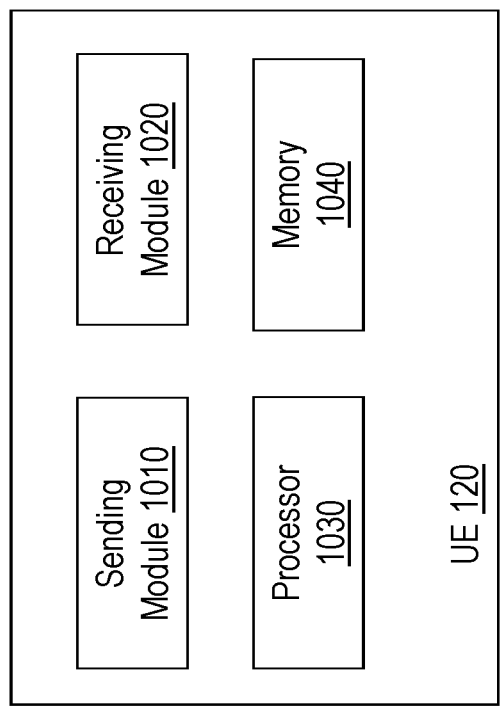
FIG. 10 is a schematic block diagram illustrating embodiments of a UE.

To perform the method actions described above in relation to FIGS. 1 and 3, the UE 120 may comprise the arrangement depicted in FIG. 10.

As mentioned above, the UE 120, the first network node 111 and the second network node 112 are operable in a wireless communications system 100. The first network node 111 is adapted to be located indoors, and the second network node 112 is adapted to be located outdoors.

The UE 120 is configured to, e.g. by means of a sending module 1210 configured to, send a message to the first network node 111. The message is adapted to indicate any one out of:

That the UE 120 is located indoors and is served by the second network node 112, and that the UE 120 is located outdoors and is served by the first network node 111, receive a signal from the first network node 111

The signal is adapted to comprise any one out of:

Adjusted transmission parameters to trigger a handover of the UE 120 to the first network node 111 located indoors, when it is indicated that the UE 120 is located indoors and is served by the second network node 112, and adjusted transmission parameters to trigger a handover of the UE 120 to the second network node 112 located outdoors, when it is indicated that the UE 120 is located outdoors and is served by the first network node 111.

The transmission parameters may be adapted to relate to any one or more out of: output power, antenna beam, handover thresholds, handover offsets, cell specific offset, time-to-trigger, and HO-related time/measure filtering constants.

The UE 120 according to any of the claims 15-16, wherein the adjusted transmission parameters are adapted to comprise an adjusted transmission parameter for time to trigger comprising:

when it is indicated that the UE 120 is located indoors and is served by the second network node 112, the transmission parameter for time to trigger is set to such as adjusted to decrease an enter-trigger period and increasing an exit-trigger period to trigger the handover of the UE 120 to the first network node 111 located indoors, and when it is indicated that the UE 120 is located outdoors and is served by the first network node 111 the transmission parameter for time to trigger is set to such as adjusted to decrease an enter-trigger period and increasing an exit-trigger period to trigger a handover of the UE 120 to the second network node 112 located outdoors.

To perform the method actions described above in relation to FIGS. 1 and 3, the UE 120 may comprise the following depicted in FIG. 10.

The UE, 120, a first network node 111 and a second network node 112 are operable in a wireless communications system 100. In this example scenario, the first network node 111 is adapted to be located indoors, and the second network node 112 is adapted to be located outdoors. The in this example scenario, the first network node 111 is adapted to be located indoors, and the second network node 112 is adapted to be located outdoors. The UE 120 is configured to, e.g. by means of a sending module 1010 configured to, send a message to the first network node 111. The message indicates any one out of:

That the UE 120 is located indoors and is served by the second network node 112, and that the UE 120 is located outdoors and is served by the first network node 111.

The UE 120 is further configured to, e.g. by means of a receiving module 1020 configured to, receive a signal from the first network node 111, which signal is adapted to comprise any one out of:

adjusted transmission parameters to trigger a handover of the UE 120 to the first network node 111 located indoors, when it is indicated that the UE 120 is located indoors and is served by the second network node 112, and adjusted transmission parameters to trigger a handover of the UE 120 to the second network node 112 located outdoors, when it is indicated that the UE 120 is located outdoors and is served by the first network node 111.

The embodiments herein may be implemented through one or more processors, such as a processor 940 in the first network node 111 depicted in FIG. 9 and a processor 1030 in the UE 120 depicted in FIG. 12, together with computer program code for performing the functions and actions of the embodiments herein. The program code mentioned above may also be provided as a computer program product, for instance in the form of a data carrier carrying computer program code for performing the embodiments herein when being loaded into the first network node 111 and/or the UE 120. One such carrier may be in the form of a CD ROM disc. It is however feasible with other data carriers such as a memory stick. The computer program code may furthermore be provided as pure program code on a server and downloaded to the respective first network node 111 and/or UE 120.

The respective first network node 111 and/or UE 120 may further comprise a memory 950, 1040 comprising one or more memory units. The respective memory comprises instructions executable by the respective processor.

The memory is arranged to be used to store e.g. information, indications, parameters, data, configurations, and applications to perform the methods herein when being executed in the respective first network node 111 and/or UE 120.

Those skilled in the art will also appreciate that the modules in the respective first network node 111 and/or UE 120, described above may refer to a combination of analog and digital circuits, and/or one or more processors configured with software and/or firmware, e.g. stored in the respective memory, that when executed by the respective one or more processors as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

Abbreviations
Abbreviation Explanation
3GPP 3rd Generation Partnership Project
BS Base Station, in LTE eNB
CSO Cell Specific Offset
CQI Channel Quality Indicator
eNB or eNodeB Evolved Node B
IE Information Element
LPP LTE Positioning Protocol
LPPe LPP Extensions
LTE 3GPP Long Term Evolution
MCS Modulation and Coding Scheme
MDT Minimize Drive Test
MIMO Multiple Input Multiple Output
PCIUF Per Cell Indoor User Fraction
PNSIUF Per Network Subset Indoor User Fraction
RDS Radio Dot System
RRC Radio Resource Control
PCI Physical Cell Identity
SON Self-Optimizing Network
TTI Transmission Time Interval
TBS Transport Block Size
UE User Equipment

The invention claimed is:

1. A method performed by a first network node, wherein the first network node, a second network node and a User Equipment (UE) operate in a wireless communications system, the first network node being located indoors, and the second network node being located outdoors, the method comprising:
when it is indicated that the UE is located indoors and is served by the second network node, adjusting transmission parameters for time-to-trigger to decrease an enter-trigger period and increase an exit-trigger period in the first network node to trigger a handover of the UE to the first network node; and
when it is indicated that the UE is located outdoors and is served by the first network node, adjusting transmission parameters for time-to-trigger to decrease an enter-trigger period and increase an exit-trigger period in the first network node to trigger a handover of the UE to the second network node.

2. The method according to claim 1, wherein the transmission parameters to be adjusted relate to any one or more out of: output power, an antenna beam, handover thresholds, handover offsets, a cell specific offset, a time-to-trigger, and handover-related time/measure filtering constants.

3. The method according to claim 1, further comprising: sending a signal to the UE, wherein the signal comprises any one out of:
adjusted transmission parameters to trigger a handover of the UE to the first network node located indoors, when it is indicated that the UE is located indoors and is served by the second network node; and
adjusted transmission parameters to trigger a handover of the UE to the second network node located outdoors, when it is indicated that the UE is located outdoors and is served by the first network node.

4. The method according to claim 1, further comprising:
receiving, a message from the UE, wherein the message indicates any one out of:
that the UE is located indoors and is served by the second network node; and
that the UE is located outdoors and is served by the first network node.

5. A method performed by a User Equipment (UE), wherein the UE, a first network node and a second network node are operable in a wireless communications system, the first network node being located indoors, the second network node being located outdoors, the method comprising:
classifying whether the UE currently is indoors or outdoors;
in response to first circumstances of the classified location being indoors and the second network node being the serving node of the UE, sending a message to the first or second network node, indicating the first circumstances, and receiving a return message that adjusts one or more transmission parameters, for triggering a handover of the UE from the second network node to the first network node, wherein, for the first circumstances, the transmission parameter for time-to-trigger is adjusted to decrease an enter-trigger period and increase an exit-trigger period to trigger the handover of the UE to the first network node; and
in response to second circumstances of the classified location being outdoors and the first network node being the serving node of the UE, sending a message to the first or second network node indicating the second circumstances, and receiving a return message that adjusts the one or more handover parameters, for triggering a handover of the UE from the first network node to the second network node, wherein, for the second circumstances, the transmission parameter for time-to-trigger is adjusted to decrease an enter-trigger period and increase an exit-trigger period to trigger a handover of the UE to the second network node.

6. The method according to claim 5, wherein the one or more handover parameters comprise one or more of: handover thresholds, handover offsets, a cell specific offset, a time-to-trigger, and handover-related time/measure filtering constants.

7. The method according to claim 5, wherein classifying whether the UE currently is indoors or outdoors comprises any one or more of: evaluating magnetic fields detected by the UE, evaluating a spectral density of ambient light detected by the UE, and evaluating a radio network fingerprint detected by the UE.

8. A first network node configured for operation in a wireless communications system at an indoors location, the first network node comprising:
communication circuitry configured for wirelessly communicating with a User Equipment (UE); and
processing circuitry operatively associated with the communication circuitry and configured to:
when it is indicated that the UE is located indoors and is served by a second network node that is located outdoors, adjust transmission parameters for timeto-trigger to decrease an enter-trigger period and increase an exit-trigger period in the first network node to trigger a handover of the UE to the first network node; and when it is indicated that the UE is located outdoors and is served by the first network node, adjust transmission parameters for time-to-trigger is adjusted to decrease an enter-trigger period and increase an exit-trigger period in the first network node to trigger a handover of the UE to the second network node.

9. The first network node according to claim 8, wherein the transmission parameters to be adjusted relate to any one or more out of: output power, an antenna beam, handover thresholds, handover offsets, a cell specific offset, a time-to-trigger, and handover-related time/measure filtering constants.

10. The first network node according to claim 8, wherein the processing circuitry is configured to:
send a signal to the UE, wherein the signal indicates any one out of:
adjusted transmission parameters to trigger a handover of the UE to the first network node located indoors, when it is indicated that the UE is located indoors and is served by the second network node; and
adjusted transmission parameters to trigger a handover of the UE to the second network node located outdoors, when it is indicated that the UE is located outdoors and is served by the first network node.

11. The first network node according to claim 8, wherein the processing circuitry is configured to:
receive, a message from the UE, wherein the message indicates any one out of:
that the UE is located indoors and is served by the second network node; and
that the UE is located outdoors and is served by the first network node.

12. A User Equipment (UE), wherein the UE, a first network node and a second network node are operable in a wireless communications system, the first network node is configured to be located indoors, the second network node is configured to be located outdoors, the UE comprising:
transceiver circuitry configured for communication with at least the first and second network nodes; and
processing circuitry operatively associated with the transceiver circuitry and configured to:
classify whether the UE currently is indoors or outdoors;
in response to first circumstances of the classified location being indoors and the second network node being the serving node of the UE, send a message to the first or second network node, indicating the first circumstances, and receive a return message that adjusts one or more handover parameters, for triggering a handover of the UE from the second network node to the first network node, wherein, for the first circumstances, the transmission parameter for time-to-trigger is adjusted to decrease an enter-trigger period and increase an exit-trigger period to trigger the handover of the UE to the first network node located indoors; and
in response to second circumstances of the classified location being outdoors and the first network node being the serving node of the UE, send a message to the first or second network node indicating the second circumstances, and receive a return message that adjusts the one or more handover parameters, for triggering a handover of the UE from the first network node to the second network node, wherein, for the second circumstances, the transmission parameter for time-to-trigger is adjusted to decrease an enter-trigger period and increase an exit-trigger period to trigger a handover of the UE to the second network node located outdoors.

13. The UE according to claim 12, wherein the one or more handover parameters relate to any one or more out of: handover thresholds, a cell specific offset, a time-to-trigger, and handover-related time/measure filtering constants.

14. The UE according to claim 12, wherein the processing circuitry is configured to classify the UE as being indoors or outdoors based on any one or more of:
evaluating magnetic fields detected by the UE, evaluating a spectral density of ambient light detected by the UE, and evaluating a radio network fingerprint detected by the UE.

* * * * *